United States Patent
Osaki

(10) Patent No.: US 7,602,677 B2
(45) Date of Patent: Oct. 13, 2009

(54) OPTICAL DISK DEVICE

(75) Inventor: Mitsuharu Osaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 493 days.

(21) Appl. No.: 11/434,180

(22) Filed: May 16, 2006

(65) Prior Publication Data

US 2006/0257124 A1    Nov. 16, 2006

(30) Foreign Application Priority Data

May 16, 2005    (JP)    ............... 2005-142351

(51) Int. Cl.
  *G11B 7/00*    (2006.01)
(52) U.S. Cl. .............. 369/30.11; 369/53.31; 369/53.36; 369/30.23; 386/95; 386/126
(58) Field of Classification Search ............ 386/95, 386/125, 126; 369/30.1, 30.11, 30.23, 30.24, 369/47.11, 47.23, 53.31, 53.35, 53.36, 30.22
See application file for complete search history.

(56) References Cited

U.S. PATENT DOCUMENTS

2002/0122658 A1* 9/2002 Fukuda et al. ............... 386/95
2003/0095479 A1* 5/2003 Shimoi et al. ............. 369/47.3

FOREIGN PATENT DOCUMENTS

| JP | 2001-243698 | 9/2001 |
| JP | 2002093038 | 3/2002 |
| JP | 2002335495 | 11/2002 |
| JP | 2003085897 | 3/2003 |

OTHER PUBLICATIONS

Machine translation of Japanese Patent JP 2002-093038A into English. Chiba et al.*
Japanese Office Action dated Nov. 14, 2007 in corresponding Japanese patent application.

* cited by examiner

*Primary Examiner*—Thang V Tran
*Assistant Examiner*—Brian Butcher
(74) *Attorney, Agent, or Firm*—Pillsbury Winthrop Shaw Pittman, LLP

(57) ABSTRACT

An optical disk device includes a pickup head configured to record and read data on and from an optical disk, and a recording/reproducing circuit such as a RF amplifier. The optical disk device also includes a control section configured to determine whether or not recording of data by the pickup head is normal and exercises control for predetermined instructions to be given to the pickup head based on the result of determination. If it is determined that the recording by the pickup head is erroneous, the control section carries out a control process such as to stop recording and then resume recording at a position moved a predetermined amount from an error position at which the pickup head has stopped recording.

4 Claims, 4 Drawing Sheets

OPTICAL DISK DEVICE

CROSS REFERENCE

This Nonprovisional application claims priority under 35 U.S.C. § 119(a) on Patent Application No. 2005-142351 filed in Japan on May 16, 2005, the entire contents of which are hereby incorporated by reference.

BACKGROUND OF THE INVENTION

The present invention relates to an optical disk device configured to read data recorded on an optical disk such as a DVD (Digital Versatile Disk) or the like and record data on such an optical disk.

Optical disk devices have become widespread which are generally configured to read data recorded on an optical disk such as a DVD or the like and record data on such an optical disk.

The DVD is capable of recording not only motion picture and sound but also a variety of data. Recording modes adapted to the DVD include various modes such as a DVD-Video format (hereinafter will be referred to as Video mode) and a VR format (hereinafter will be referred to as VR mode).

The Video mode is a format originally made for DVD players for reproduction (ROM) only and hence has a high reproduction compatibility among existing DVD players. In the Video mode, data is recorded in a predetermined unit of cells. A cell consists of plural VOBUs (Video Object Unit). In such a VOBU, NV_PCK (Navigation Pack) is placed at the head and video and audio data (AV data) and like data as packed are inserted following NV_PCK.

However, since the Video mode is the format for reproduction only as described above, the Video mode has a drawback that it is difficult to record AV data in real time unlike the VR mode. The reason for this difficulty is that in newly recording AV data contained in a VOBU (to be referred to as current VOBU), information on other plural VOBUs to be recorded subsequently to the current VOBU has to be written to the current VOBU. Specifically, the Video mode requires that such information as the initial addresses of respective of the other plural VOBUs and the reproduction time of the cell and like information be written to the NV_PCK area in the current VOBU. For this reason, the other plural VOBUs to be reproduced subsequently to the current VOBU need be temporarily secured in semiconductor memory or the like in recording the current VOBU. This is one of the causes of the difficulty in real-time recording.

When the DVD is in a bad storage condition, the optical disk is subject to damage, stain and the like on its recording surface. If a certain degree of damage, stain or the like occurs on the recording surface of the optical disk, an error will result. Such an error makes it impossible to detect a target recording position, thus causing recording to be interrupted.

A conventional optical disk device is configured to carry out a recovery process for recovery from such an error thereby realizing stabilized recording on the DVD. The recovery process includes: performing a seek to find out an area allowing stabilized recording therein; determining whether or not the area sought is recordable; and resuming recording if the area is recordable.

Such a conventional optical disk device, however, involves the following problem associated with recording of real-time data such as a television program. That is, during a seek in the above-described recovery process, data is not recorded on the optical disk and, for this reason, all data inputted in real time is temporarily stored in semiconductor memory. Accordingly, the amount of data accumulated in the semiconductor memory increases during the seek. When the amount of accumulated data exceeds the maximum memory capacity, data inputted thereafter in real time overwrites the data in the memory. As a result, the data in the memory (data not yet recorded on the optical disk) is lost, which raises a data break-off problem (buffer overflow). In order to avoid this problem, the capacity of the semiconductor memory needs to be increased to such an extent as to obviate overwriting of data unrecorded on the optical disk by data inputted in real time.

In attempt to solve this problem, an optical disk device as described in Japanese Patent Laid-Open Publication No. 2001-243698 has been proposed.

This optical disk device has a recording rate of data to be recorded on the optical disk that is set higher than an input rate of data to be inputted to the semiconductor memory. For this reason, usually, data inputted to the semiconductor memory is immediately recorded on the optical disk. This optical disk device is configured to perform a seek upon occurrence of an error and set the input rate to a lower value than the usual input rate at the time the amount of data accumulated in the semiconductor memory reaches a fixed amount during the seek.

However, the optical disk device described in the above-noted Japanese Patent Laid-Open Publication No. 2001-243698 is made without any consideration of Video mode recording. For example, when an error occurs, the optical disk device performs a seek to resume recording; however, a problem arises when an error occurs after NV_PCK has been recorded on the optical disk. Specifically, in NV_PCK recorded on the optical disk there are written the initial addresses of respective of the aforementioned other plural VOBUs as already fixed ones and, hence, these initial addresses cannot be changed any longer. If the optical disk device performs a seek by force to resume recording in disregard of that fact, data recorded cannot be reproduced correctly.

Accordingly, it is an object of the present invention to provide an optical disk device capable of realizing stabilized recording on the DVD even when an error occurs during recording in the Video mode.

SUMMARY OF THE INVENTION

An optical disk device according to the present invention includes: an encoder section configured to encode data inputted from an input source, and an update and storage section configured to update and store the data encoded by the encoder section. The update and storage section comprises semiconductor memory for example. Examples of optical disks for use in the optical disk device include a DVD-R, a DVD+R and a DVD-RW.

The optical disk device also includes a pickup head configured to irradiate the optical disk set on a device body with laser light to record the data stored in the update and storage section on the optical disk, and a mover section configured to move the pickup head radially of the optical disk to change a laser light irradiating position of the pickup head relative to the optical disk.

Further, the optical disk device includes a control section configured to determine whether or not recording by the pickup head is normal and exercise control for predetermined instructions to be given to the pickup head and the mover section.

If it is determined that the recording by the pickup head is erroneous, the control section instructs the pickup head to stop recording, notifies the mover section of a position moved a predetermined amount from an error position at which the pickup head has stopped recording as a recording resume position of the pickup head, and then instructs the pickup head to resume recording at the recording resume position.

In the arrangement described above, the predetermined amount is a preset value, for example, a distance on the optical disk that is equivalent to data x seconds long (in reproduction from the optical disk).

Further, the pickup head records the data in a predetermined unit of cells.

When instructing the pickup head to resume recording at the recording resume position, the control section determines whether or not the error position is located at the head of a cell. Thereafter, the control section carries out the following control process:

(1) if it is determined that the error position is located at the head of the cell, the control section instructs the pickup head to resume recording at the recording resume position from the head of the cell stored in the update and storage section;

(2) if it is determined that the error position is not located at the head of the cell and that the recording resume position located within the cell, the control section instructs the pickup head to resume recording at the recording resume position from a data item located within the cell coincidently with the recording resume position; and (3) if it is determined that the error position is not located at the head position of the cell and that the recording resume position not located within the cell, the control section instructs the pickup head to resume recording at the recording resume position from the head of a cell to be recorded subsequently.

With this feature, the recovery method changes depending on where an error occurs in the cell recorded on the optical disk, and the three recovery processes (1) to (3) in total are provided.

DETAILED DESCRIPTION OF THE PREFERRED EMBODIMENTS

Figure 1:
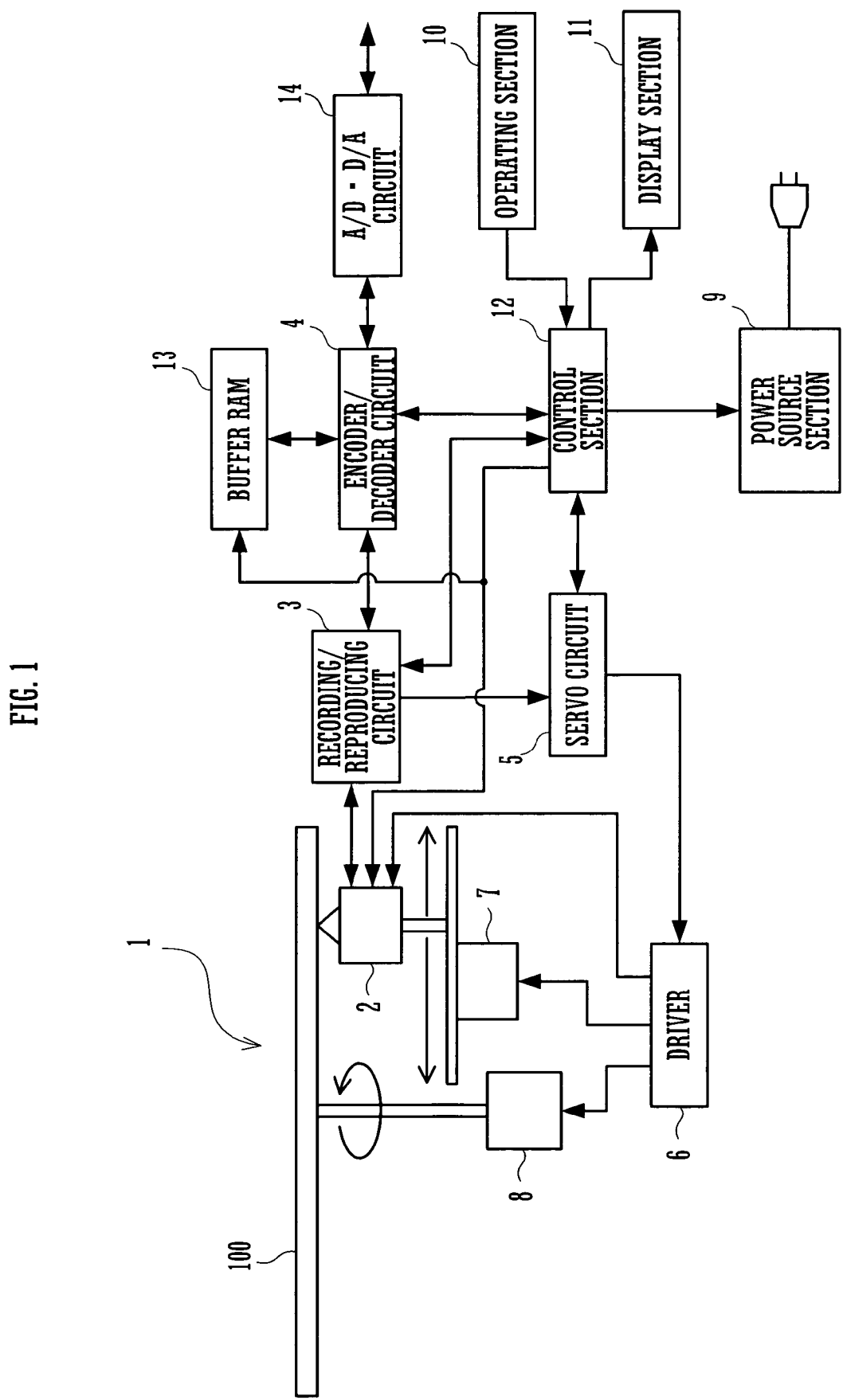
FIG. 1 is a block diagram showing the basic configuration of an optical disk device embodying the present invention.

FIG. 1 is a block diagram showing the basic configuration of an optical disk device embodying the present invention.

Optical disk device 1 includes a pickup head 2 (hereinafter will be referred to as PU head 2) configured to record and read data on and from an optical disk 100, and recording/reproducing circuit 3 comprising a RF (Radio Frequency) amplifier and the like. The optical disk device 1 also includes an encoder/decoder circuit 4 as an encoder section, a servo circuit 5 configured to generate driving signals, a driver 6 configured to exercise servo control, a thread motor 7 as a mover section, a spindle motor 8 configured to rotate the optical disk 100, a power source section 9 configured to supply current to different components, an operating section 10 provided with a reproduction key and a recording key, a display section 11 configured to display information, a control section 12 configured to control a device body, buffer RAM 13 as an update and storage section, and an A/D·D/A circuit 14 configured to perform A/D or D/A conversion.

The optical disk device 1 according to this embodiment reads AV data recorded on the optical disk 100 and records AV data on the optical disk 100. The optical disk 100 is DVD-R, DVD+R or DVD-RW for example. The Video mode is adopted as the mode of recording AV data on the optical disk 100.

The PU head 2 includes non-illustrated components including a laser diode (LD), collimator lens, beam splitter, objective lens, photodetector, thread motor, and biaxial actuator.

The PU head 2 is movably mounted on a shaft extending radially of the optical disk 100. The thread motor 7 moves the PU head 2 radially of the optical disk 100.

The LD is a light source configured to output laser light, and the photodetector, which comprises plural light-receiving elements, detects reflected light from the optical disk 100. The photodetector has a light-receiving area substantially equally divided into four light-receiving regions.

The objective lens adjusts the laser light irradiation point on the optical disk 100. The biaxial actuator moves the objective lens toward and away from and radially of the optical disk 100.

In the reproduction process, the PU head 2 irradiates the optical disk 100 with laser light of a power for reading and detects reflected light from the optical disk 100 by means of the photodetector. By so doing, the PU head 2 optically reads information recorded on the optical disk 100.

In the recording process, on the other hand, the PU head 2 controls laser light of a power for recording in accordance with digital signals inputted from the recording/reproducing circuit 3 to irradiate the recording surface of the optical disk 100 with laser light.

The PU head 2 receives data inputted in a predetermined unit of cells from the recording/reproducing circuit 3. For this reason, the PU head 2 records the data in the predetermined unit of cells. This means that once the cell starts being recorded on the optical disk 100, the PU head 2 cannot stop recording until completion of recording of the cell even if the user operates to stop recording.

In the reproduction process, the recording/reproducing circuit 3 generates RF signals based on the outputs of the plural light-receiving elements of the PU head 2, amplifies the RF signals and outputs them to the encoder/decoder circuit 4.

In the recording process, the recording/reproducing circuit 3 outputs digital signals inputted from the encoder/decoder circuit 4 to the PU head 2.

Further, the recording/reproducing circuit 3 generates a tracking error signal, focus error signal and a like signal and outputs them to the servo circuit 5.

In the reproduction process, the encoder/decoder circuit 4 processes RF signals inputted from the recording/reproducing circuit 3 to extract AV data therefrom and then detects and corrects an error in the AV data. Thereafter, the encoder/decoder circuit 4 decodes the AV data and temporarily stores the decoded AV data in the buffer RAM 13. The AV data extracted here is data encoded by MPEG (Moving Picture Expert Group) for example. The AV data stored in the buffer RAM 13 is transferred to the A/D·D/A circuit 14.

In the recording process, the encoder/decoder circuit 4 encodes AV data digitized by the A/D·D/A circuit 14 (by means of MPEG for example) and temporarily stores the encoded AV data in the buffer RAM 13. At this time, the AV data is inserted as packed and then stored as a VOBU having NV_PCK at the head thereof in the buffer RAM 13 (see FIGS. 2(D) and 2(E) to be referred to later).

In order to record a current VOBU on the optical disk 100, the buffer RAM 13 secures other plural VOBUs to be recorded subsequently to the current VOBU (up to the VOBU to be recorded two minutes later at maximum). The "current VOBU" means a VOBU containing AV data that is about to be newly recorded.

At the time the buffer RAM 13 has secured the other plural VOBUs, the encoder/decoder circuit 4 writes the initial addresses with respect to the other plural VOBUs to be recorded subsequently to the current VOBU, the cell reproduction time and the like into NV_PCK of the current VOBU. Further, the encoder/decoder circuit 4 performs error detection and correction and encoding and then outputs the encoded data (digital signals) to the recording/reproducing circuit 3.

The buffer RAM 13 has a minimum capacity required to store VOBUs up to the one to be recorded two minutes later at maximum and a capacity equivalent to the time required for writing these VOBUs. The latter capacity is provided for use when an error occurs during the time period from the output of the current VOBU from the buffer RAM 13 until the writing of the current VOBU to the optical disk 100. When such an error occurs, the current VOBU remains as held by the buffer RAM 13.

The configuration described above is capable of recovery processing even if the semiconductor memory used therein has a small capacity.

In the reproduction process, the A/D·D/A circuit 14 converts data elongated by the encoder/decoder circuit 4 to analog reproduction signals and outputs these signals to the exterior.

In the recording process, the A/D·D/A circuit 14 receives TV broadcasting signals via an antenna such as a TV antenna, digitizes these signals, and outputs the digitized signals to the encoder/decoder circuit 4.

The servo circuit 5 generates a tracking servo signal and a focus servo signal for tracking adjustment and focus adjustment, respectively, based on the tracking error signal and focus error signal inputted from the recording/reproducing circuit 3. Also, the servo circuit 5 generates a thread motor driving signal for driving the thread motor 7 based on a seek control signal inputted from the control section 12 and outputs the thread motor driving signal to the driver 6.

The driver 6 drives the biaxial actuator and the thread motor 7 in the PU head 2 based on the tracking servo signal, focus servo signal and thread motor driving signal.

The thread motor 7 moves the PU head 2 radially of the optical disk 100 to change the laser light irradiating position of the PU head 2 relative to the optical disk 100.

The spindle motor 8 causes the optical disk 100 to rotate. The power source section 9 takes out driving power from a commercial power source and supplies the driving power to the different components of the optical disk device 1.

The operating section 10 is provided for the user to input various instructions to the optical disk device 1. Such an instruction inputted by the user to the optical disk device 1 is transferred to the control section 12.

The display section 11 displays time, information indicative of the operation status of the optical disk device 1, information about AV data under reproduction, and like information.

The control section 12, which comprises a microcomputer for example, controls the different components of the optical disk device 1 in accordance with instructions inputted by the user to the optical disk device 1.

Figure 2A:
FIGS. 2A to 2E are diagrams illustrating the data structure of data recorded on an optical disk in the Video mode.
Figure 2B:

FIGS. 2A to 2E are diagrams illustrating the data structure of data recorded on the optical disk in the Video mode. The data recorded on the optical disk 100 comprises a file system, menu data, and a title, which are separately located on the disk 100 from the inner periphery toward the outer periphery thereof, as shown in FIG. 2A.

The file system has the description of information related to reproduction of the entire DVD-Video, what is called root menu information.

The menu data has the description of contents for use in the title menu as well as the description of backup files for the file system.

The title comprises VTSI (Video Title Set Information), VOBS (Video Object Set), and VTSI bup (see FIG. 2B) and is capable of holding a maximum of 99 titles. Title 1, . . . , i represents the number of titles. Since ordinary DVDs often are of the type having one recordable side with two layers (not more than 9.4 GB), the number of titles is usually one or two.

VTSI has the description of control information on VTS.

Figure 2C:

VOBS has the description of contents for reproduction of the title and comprises plural cells (see FIG. 2C).

VTSI has the description of backup files for VTSI.

In the Video mode, data is recorded in a predetermined unit of cells.

Figure 2D:
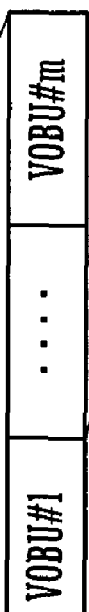

Each cell comprises plural VOBUs (Video Object Unit) as shown in FIG. 2D. A maximum number of cells per title is 255. Accordingly, if data in an amount equivalent to 10 hours is to be recorded on the optical disk, one cell consists of data in an amount equivalent to 2 minutes and 30 seconds for example.

It is possible to record data in an amount equivalent to 10 hours in one cell. However, once the cell starts being recorded on the optical disk, the optical disk device 1 cannot stop recording until completion of recording of the cell even if the user operates to stop recording. For this reason, one cell desirably contains data in an amount equivalent to about 2 minutes 30 seconds for the sake of convenience.

Figure 2E:

Each of the VOBUs comprises NV_PCK placed at the head and a pack of video and audio data (AV data) and the like inserted subsequently to NV_PCK (see FIG. 2E).

When recording the current VOBU, it is required that such information as the initial addresses of respective of other plural VOBUs to be recorded subsequently to the current VOBU, the reproduction time for the cell and the like be written into the NV_PCK area of the current VOBU. For this reason, the other plural VOBUs to be reproduced subsequently to the current VOBU need be temporarily secured in the semiconductor memory or the like in recording the current VOBU. This is one of the causes of the difficulty in real-time recording.

Figure 3:
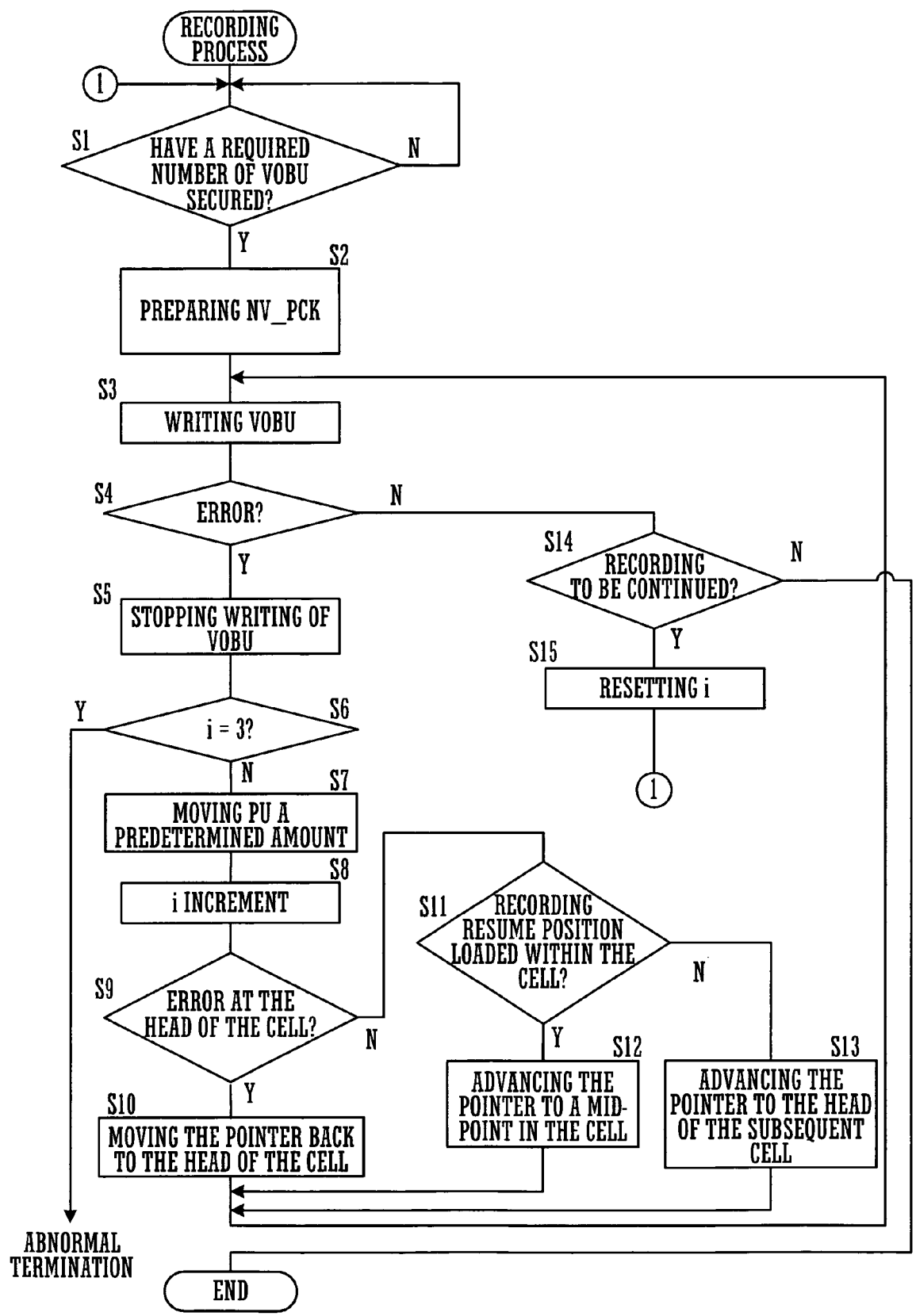
FIG. 3 is a flowchart of an operation performed by a control section in a recording process of the optical disk device embodying the present invention.

FIG. 3 is a flowchart of an operation performed by the control section in the recording process of the optical disk device embodying the present invention. This operation is performed in response to an instruction to record inputted through the operating section 10 by the user. The mode of recording AV data on the optical disk 100 is the Video mode as in the case of FIG. 1.

In response to an instruction to record inputted through the operation section 10 by the user, the control section 12 determines whether or not the buffer RAM 13 has secured the current VOBU and other plural VOBUs to be recorded subsequently to the current VOBU (up to the VOBU to be recorded two minutes later at maximum) (step S1).

After the aforementioned plural VOBUs have been secured, the control section 12 instructs the encoder/decoder circuit 2 to prepare NV_PCK (step S2).

Thereafter, the control section 12 issues an instruction to write the VOBUs onto the optical disk 100 (step S3). According to this instruction, the encoder/decoder circuit 4 transfers the encoded VOBUs to the recording/reproducing circuit 3, which in turn transfers the encoded VOBUs to the PU head 2, which in turn starts writing the VOBUs onto the optical disk 100.

Thus, recording on the optical disk 100 is started. Once recording is started, data inputted to the buffer RAM 13 in real time overwrites previously recorded data on the optical disk 100 and the recording on the optical disk 100 continues.

During recording on the optical disk 100, the control section 12 determines whether or not the recording proceeds normally, i.e., whether or not an error has occurred (step S4). Such an error is a defect condition for example. The defect condition is a condition which does not allow servo control to be exercised normally based on the focus error signal (FE signal) or the tracking error signal (TE signal) because of the presence of damage, stain or the like on the recording surface of the optical disk. This determination is based on detection of the waveform of the FE signal (see, for example, Japanese Patent Laid-Open Publication No. HEI 11-353651 for detection of the defect condition).

If it is determined in step S4 that no error has occurred during recording on the optical disk 100, the recording operations of respective of the different components forming the device body are terminated. At that time, the control section 12 determines whether or not to continue recording (step S14). This determination is made by causing the display section 11 to display a prompt "whether or not to continue recording" thereby to cause the user to input his or her desired choice through the operation section 10.

If the user inputs the choice to continue recording, the control section 12 resets the number of times i (see steps 7 and 8 to be described later) of notification of recording resume position of the PU head 2 to the thread motor 7 (step S15) and the process returns to step S1 to continue processing. On the other hand, if the user inputs the choice not to continue recording, the control section 12 terminates the recording process.

If it is determined in step S4 that an error has occurred, the control section 12 instructs the PU head 2 to stop recording upon the occurrence of the error (step S5).

Subsequently, the control section 12 determines whether or not the number of times i (see steps 7 and 8 to be described later) of notification of recording resume position of the PU head 2 to the thread motor 7 has reached three (step S6).

If the number of times 1 has not reached three, the control section 12 notifies the thread motor 7 of the recording resume position of the PU head 2 (step S7) and then increases the number of times i by 1 (step S8). The number of times i is stored in a register (not shown) incorporated in the control section 12.

The "recording resume position", as used herein, is a position moved by a predetermined amount (on the optical disk 100) from a recording stop position (error position). The predetermined amount is a preset value of distance on the optical disk 100 which is equivalent to an amount of data x seconds long (in reproducing data recorded on the optical disk 100) for example. Data is not recorded in a blank area resulting from the move by the predetermined amount and, hence, nothing is displayed on the screen in the reproduction from the optical disk 100. That is, if the predetermined amount is "a value of distance on the optical disk 100 that is equivalent to an amount of data x seconds long", no data is displayed on the screen for x seconds when the optical disk is subjected to reproduction by the user.

If the predetermined amount is too large, the user may mistake such a long undisplayed condition for a failure of the optical disk device. For this reason, the smaller the predetermined amount is, the more desirable it is.

Figure 4A:
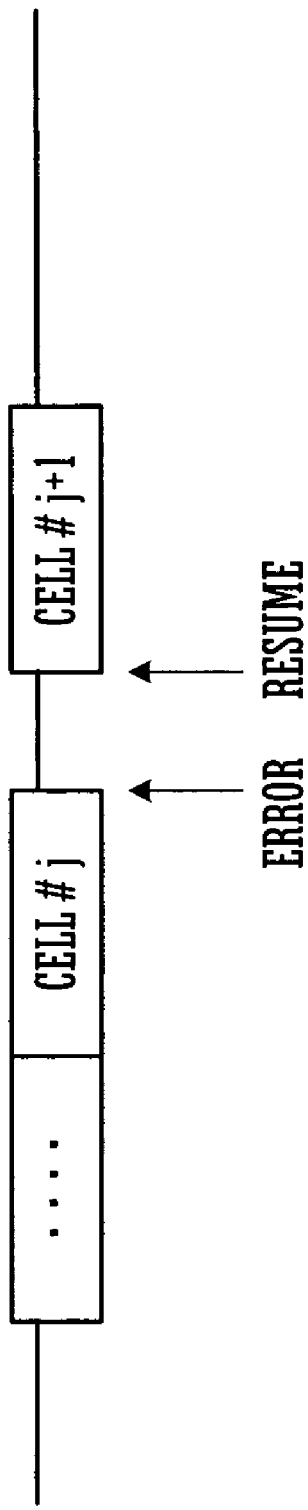
FIGS. 4A to 4C are diagrams illustrating a recovery method employed by the optical disk device embodying the present invention.
Figure 4B:
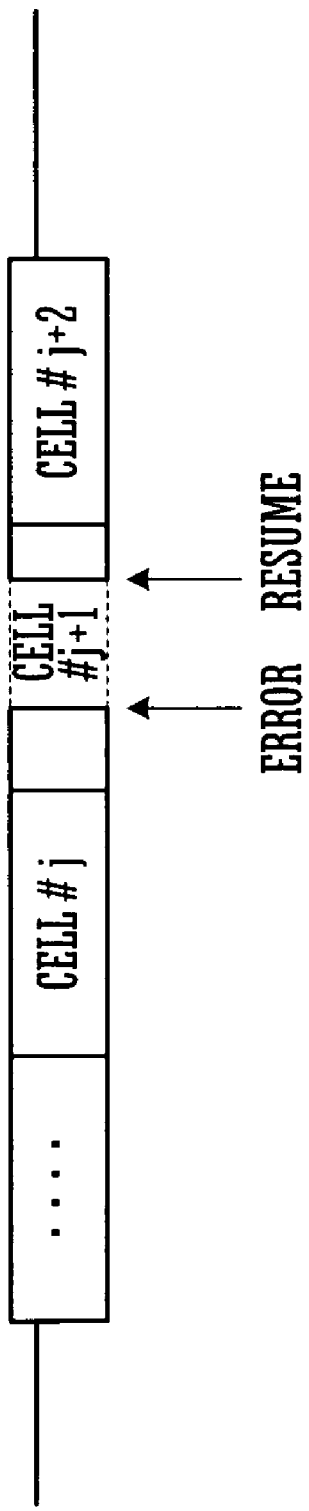
Figure 4C:
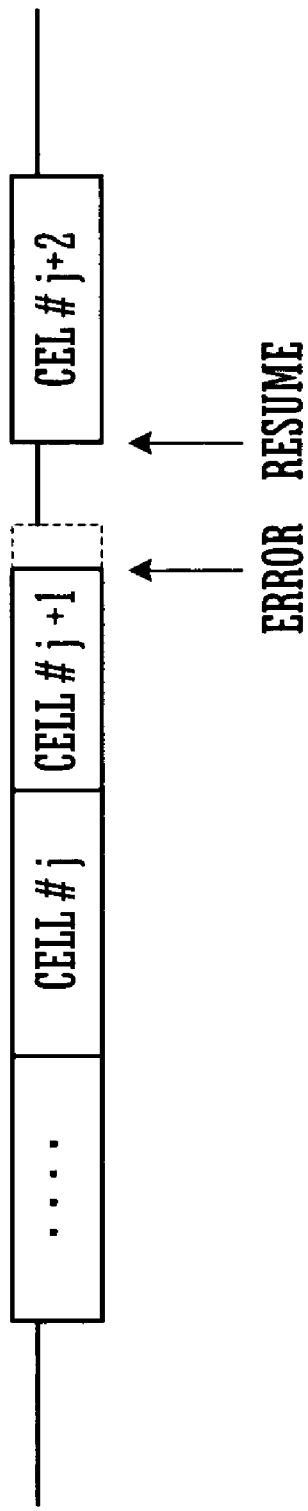

FIGS. 4A to 4C are diagrams illustrating a recovery method employed by the optical disk device embodying the present invention.

In the figures, cell #j represents a cell which the PU head 2 recorded on the optical disk 100, while cell #j+1 represents a cell which the PU head 2 could not record on the optical disk 100 due to the occurrence of an error. FIG. 4A illustrates the occurrence of an error at the head of the cell #j+1 and the position of data to be resumed recording in this case. FIG. 4B illustrates the occurrence of an error in the middle of the cell #j+1 and the position of data to be resumed recording in this case. FIG. 4C illustrates the occurrence of an error at the rear of the cell #j+1 and the position of data to be resumed recording in this case.

The control section 12 changes the recovery method depending on where the error occurred in a cell under recording on the optical disk 100 (see ERRORs in respective of FIGS. 4A to 4C). In this embodiment, the control section 12 carries out three recovery processes (steps s10, s12 and s13) in total.

The control section 12 determines whether or not an error occurred at the head of the cell #j+1 which the PU head 2 could not record on the optical disk 100 (step S9). If the error occurred at the head of the cell #j+1 (see "ERROR" in FIG. 4A), the control section 12 moves the pointer back to the initial data of the cell #j+1 stored in the buffer RAM 13 (step S10) and instructs the PU head 2 to resume recording data from the initial data at the recording resume position (see "RESUME" in FIG. 4A) (step S3).

Since the buffer RAM 13 holds the current VOBU during the time period from the output of the current VOBU by the buffer RAM 13 until the writing of the current VOBU onto the optical disk 100 in preparation for the occurrence of an error as described earlier, the operation of step S10 becomes possible.

If it is determined in step S9 that no error occurred at the head of the cell #j+1 which the PU head 2 could not record on the optical disk 100, the control section 12 determines whether or not the recording resume position is located within the cell (step S11).

If it is determined that the recording resume position is located within the cell (see "RESUME" in FIG. 4B), the control section 12 advances the pointer to a data item that is present within the cell #j+1 at an address coinciding with the recording resume position (step S12) and instructs the PU head 2 to resume recording data from the data item of concern at the recording resume position (see "RESUME" in FIG. 4B) (step S3).

If it is determined that the recording resume position is not located within the cell (see "RESUME" in FIG. 4C), the control section 12 advances the pointer to the initial data of the cell #j+2 to be recorded subsequently to the current cell #j+1 (step S13) and instructs the PU head 2 to resume recording data from that initial data at the recording resume position (see "RESUME" in FIG. 4C) (step S3).

The optical disk device 1, which operates as described above, can carry out a proper recovery process meeting the Video mode recording in response to the occurrence of an error during recording in the Video mode even if the semiconductor memory used therein has a small capacity. Thus, stabilized recording on a DVD can be realized.

If it is determined in step S6 that the number of times i reached three, the control section 12 terminates the recording process abnormally. The reason for the abnormal termination is that the optical disk 100 can be judged as being damaged too much to use any longer. The display section 11 notifies the user of the abnormal termination and urges the user to replace the optical disk 100 with another one.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. An optical disk device comprising:
    an encoder section configured to encode first data inputted from an input source, and output the first data as a Video Object Unit (VOBU) which stores the first data and address information with respect to each of other multiple VOBUs which stores second data to be recorded on the optical disk subsequently to the first data;
    an update and storage section configured to update and store the VOBU encoded by the encoder section:
    a pickup head configured to irradiate an optical disk with laser light to record the VOBU stored in the update and storage section on the optical disk by unit of a cell which consists of multiple VOBUs;
    a mover section configured to move the pickup head radially of the optical disk to change a laser light irradiating position of the pickup head relative to the optical disk; and a control section configured to notify the mover section of a position moved a predetermined amount from an error position at which the pickup head has stopped recording as a recording resume position of the pickup head, when an error occurs during recording of a cell by the pickup head and the recording is stopped, wherein
    the control section carries out a control process in which:
    the control section determines whether or not the error position is located at a head of a cell, and whether or not the recording resume position is located within the cell;
    if it is determined that the error position is located at the head of the cell, the control section instructs the pickup head to resume recording at the recording resume position from the head of the cell stored in the update and storage section;
    if it is determined that the error position is not located at the head of the cell and that the recording resume position is located within the cell, the control section instructs the pickup head to resume recording at the recording resume position from a data item located within the cell coincidently with the recording resume position; and if it is determined that the error position is not located at the head position of the cell and that the recording resume position is not located within the cell, the control section instructs the pickup head to resume recording at the recording resume position from the head of a cell to be recorded subsequently.

2. The optical disk device according to claim 1, wherein the update and storage section has a storage capacity less than a minimum capacity required to store the predetermined unit of cells.

3. The optical disk device according to claim 1, wherein the control section counts the number of times of notification of the recording resume position of the pickup head to the mover. section, and terminates recording abnormally if the number of times becomes larger than a fixed number of times.

4. The optical disk device according to claim 1, wherein the update and storage section has a storage capacity comprising:
    a first capacity required to store a current VOBU and other plural VOBUs tote recorded subsequently to the current VOBU; and
    a second capacity required to keep storing the current VOBU during a time period that it takes to record on the optical disk the current VOBU which is stored in the update and storage section.

* * * * *